United States Patent
Inukai (10) Patent No.: US 10,503,135 B2
(45) Date of Patent: Dec. 10, 2019

(54) CAM SOFTWARE AND WIRE ELECTRICAL DISCHARGE MACHINE

(71) Applicant: Mitsubishi Electric Corporation, Tokyo (JP)

(72) Inventor: Ken Inukai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 151 days.

(21) Appl. No.: 15/319,932

(22) PCT Filed: Aug. 26, 2014

(86) PCT No.: PCT/JP2014/072336
§ 371 (c)(1),
(2) Date: Dec. 19, 2016

(87) PCT Pub. No.: WO2016/030971
PCT Pub. Date: Mar. 3, 2016

(65) Prior Publication Data
US 2017/0139389 A1  May 18, 2017

(51) Int. Cl.
*G05B 19/042* (2006.01)
*B23H 7/02* (2006.01)
(Continued)

(52) U.S. Cl.
CPC ........... *G05B 19/0426* (2013.01); *B23H 7/02* (2013.01); *G05B 17/02* (2013.01);
(Continued)

(58) Field of Classification Search
CPC .............. G05B 19/0426; G05B 17/02; G05B 19/4097; G05B 2219/35012; G05B 2219/45221; B23H 7/02; B23H 7/20
(Continued)

(56) References Cited

U.S. PATENT DOCUMENTS

| 5,243,166 A | * | 9/1993 | Nakayama | B23H 7/101 |
| | | | | 219/69.12 |
| 5,506,381 A | * | 4/1996 | Matsushima | B23H 7/10 |
| | | | | 206/388 |

(Continued)

FOREIGN PATENT DOCUMENTS

| DE | 41 05 291 A1 | 8/1992 |
| EP | 0 505 570 A1 | 9/1992 |

(Continued)

OTHER PUBLICATIONS

International Search Report for PCT/JP2014/072336, dated Dec. 2, 2014.

*Primary Examiner* — Kenneth M Lo
*Assistant Examiner* — Michael W Choi
(74) *Attorney, Agent, or Firm* — Sughrue Mion, PLLC; Richard C. Turner (57) ABSTRACT

CAM software creates a machining program that executes wire electrical discharge machining under appropriate machining conditions even when the actual arrangement state is unknown at the time of creating the machining program. The CAM software causes a computer to create a machining program for a wire electrical discharge machine to machine a workpiece. The computer is connected to a database that stores a correspondence between setting conditions of the wire electrical discharge machine and the workpiece, and machining conditions suitable for the setting conditions, and the computer performs a first procedure of selecting a plurality of different setting conditions, a second procedure of retrieving machining conditions corresponding to the selected setting conditions, from the database, and a third procedure of creating the machining program that designates one of the machining conditions retrieved in the (Continued)

second procedure, with respect to each of the setting conditions selected in the first procedure.

5 Claims, 7 Drawing Sheets

(51) Int. Cl.
    *G05B 17/02*      (2006.01)
    *G05B 19/4097*      (2006.01)
    *B23H 7/20*      (2006.01)

(52) U.S. Cl.
    CPC ............ *G05B 19/4097* (2013.01); *B23H 7/20* (2013.01); *G05B 2219/35012* (2013.01); *G05B 2219/45221* (2013.01); *Y02P 90/265* (2015.11)

(58) Field of Classification Search
    USPC .......................................................... 700/162
    See application file for complete search history.

(56) References Cited

U.S. PATENT DOCUMENTS

| | | | | |
|---|---|---|---|---|
| 5,757,649 A | * | 5/1998 | Kato | .................. G05B 19/4097 |
| | | | | 700/182 |
| 5,959,865 A | | 9/1999 | Milan et al. | |
| 2003/0057188 A1 | * | 3/2003 | Sendai | ..................... B23H 7/20 |
| | | | | 219/69.12 |
| 2007/0051701 A1 | * | 3/2007 | Ogata | ...................... B23H 7/20 |
| | | | | 219/69.17 |
| 2015/0094845 A1 | | 4/2015 | Inukai et al. | |
| 2015/0127136 A1 | * | 5/2015 | Abe | ........................ B23H 7/20 |
| | | | | 700/162 |

FOREIGN PATENT DOCUMENTS

| | | |
|---|---|---|
| JP | 59-169717 A | 9/1984 |
| JP | 59-227317 A | 12/1984 |
| JP | 63-011228 A | 1/1988 |
| JP | 05-224724 A | 9/1993 |
| JP | 05-345230 A | 12/1993 |
| JP | 06-262439 A | 9/1994 |
| JP | 10-507289 A | 7/1998 |
| JP | 2004-268220 A | 9/2004 |
| JP | 5279958 B1 | 9/2013 |
| WO | 92/005005 A1 | 4/1992 |

* cited by examiner

N10 (Z-AXIS HEIGHT 10 mm: WIRE DIAMETER Ø0.2 mm: WIRE MATERIAL BS)

H11=1011 (ROUGH MACHINING CONDITION)

H12=1012 (FINISH MACHINING CONDITION)

N20 (Z-AXIS HEIGHT 20 mm: WIRE DIAMETER Ø0.2 mm: WIRE MATERIAL BS)

H11=1021 (ROUGH MACHINING CONDITION)

H12=1022 (FINISH MACHINING CONDITION)

N30 (Z-AXIS HEIGHT 30 mm: WIRE DIAMETER Ø0.2 mm: WIRE MATERIAL BS)

H11=1031 (ROUGH MACHINING CONDITION)

H12=1032 (FINISH MACHINING CONDITION)

N40 (Z-AXIS HEIGHT 10 mm: WIRE DIAMETER Ø0.25 mm: WIRE MATERIAL BS)

H11=1041 (ROUGH MACHINING CONDITION)

H12=1042 (FINISH MACHINING CONDITION)

⋮

N500

| DETECT ARRANGEMENT STATE, READ MACHINING PROGRAM OF SEQUENCE NUMBER CORRESPONDING TO ARRANGEMENT STATE, AND SET COMMAND CODES CORRESPONDING TO ARRANGEMENT STATE IN H11 AND H12 |
|---|

N600

EH11

N700

| DESIGNATE MACHINING OF ROUGH MACHINING SHAPE |
|---|

N800

EH12

N900

| DESIGNATE MACHINING OF FINISH MACHINING SHAPE |
|---|

CAM SOFTWARE AND WIRE ELECTRICAL DISCHARGE MACHINE

CROSS REFERENCE TO RELATED APPLICATIONS

This is a National Stage of International Application No. PCT/JP2014/072336 filed Aug. 26, 2014, the contents of all of which are incorporated herein by reference in their entirety.

FIELD

The present invention relates to CAM (Computer Aided Manufacturing) software for creating a machining program of a wire electrical discharge machine, and a wire electrical discharge machine that machines a workpiece based on a machining program.

BACKGROUND

A machining condition of a wire electrical discharge machine includes many parameters such as a voltage, a wire tension, and a machining fluid pressure. Because there is an appropriate machining condition corresponding to an arrangement state, which is a setting condition of the wire electrical discharge machine and a workpiece, such as a workpiece thickness, a workpiece material, a wire material, a wire diameter, and a distance between upper and lower nozzles, the machining condition is changed depending on the arrangement state.

When a machining condition is added to an NC (Numerical Control) program, which is a machining program of a wire electrical discharge machine, any one of methods (1) to (4) described below is conventionally used.

(1) An operator of CAM selects a machining condition from a machining condition table such as a brochure, edits an NC program, and adds a command code that designates the machining condition.

(2) An operator of CAM retrieves a machining condition from a machining condition database connected to a PC (Personal Computer) that executes CAM software, and adds a command code that designates the machining condition to an NC program using a function of the CAM software.

(3) An operator of a wire electrical discharge machine selects a machining condition from a machining condition table such as a brochure, edits an NC program, and adds a command code that designates the machining condition.

(4) An operator of a wire electrical discharge machine retrieves a machining condition from a machining condition database connected to the wire electrical discharge machine, and adds a command code that designates the machining condition to an NC program using a function of the wire electrical discharge machine.

While the machining condition depends on the arrangement state, the operator of CAM does not know an actual arrangement state in the cases of the methods (1) and (2) described above and thus assumes a specific arrangement state to add a machining condition to an NC program. Therefore, when the operator of CAM and the operator of the wire electrical discharge machine do not share information correctly, a mismatch occurs between the arrangement state and the machining condition, which becomes a cause of a machining error.

In cases of the methods (3) and (4) described above, the operator of the wire electrical discharge machine needs to have a technique to add a command code that designates a machining condition to an NC program, and the lack of the technique becomes a cause of a machining error. Therefore, the methods (3) and (4) described above are not desirable when all the techniques are to be aggregated to the operator of CAM.

CITATION LIST

Patent Literature

Patent Literature 1: Japanese Patent No. 5279958

SUMMARY

Technical Problem

As described above, only a command code for one machining condition at a maximum is described in a conventional NC program according to a specific arrangement state. Therefore, a machining error may possibly occur due to machining under a machining condition that is not suitable for the actual arrangement state. Furthermore, when a machining condition is not described in an NC program or when an arrangement state is changed after a machining condition is described in an NC program, a command code for the machining condition needs to be additionally described or changed. Accordingly, there are risks of occurrence of loss of time due to an additionally-describing or changing operation and occurrence of an operation error. Therefore, there is a problem that, in order to cause a wire electrical discharge machine to perform machining under an appropriate machining condition, it is necessary to rely on the experience or capability of the operator.

The present invention has been achieved in view of the above problem, and an object of the present invention is to provide CAM software that can create a machining program capable of providing wire electrical discharge machining under an appropriate machining condition even when an actual arrangement state is unknown at the time of creating the machining program.

Solution to Problem

To solve the above described problem and achieve the object, a CAM software that causes a computer to create a machining program for a wire electrical discharge machine that machines a workpiece under a machining condition, the computer being connected to a database that stores therein a correspondence between setting conditions of the wire electrical discharge machine and the workpiece, and the machining conditions suitable for the setting conditions. The CAM software causes the computer to perform: a first procedure of selecting a plurality of the setting conditions different from each other; a second procedure of retrieving the machining conditions corresponding to the setting conditions selected in the first procedure from the database; and a third procedure of creating the machining program that designates one of the machining conditions retrieved in the second procedure with respect to each of the setting conditions selected in the first procedure.

Advantageous Effects of Invention

According to the CAM software of the present invention, an effect is obtained where it is possible to create a machining program capable of providing wire electrical discharge machining under an appropriate machining condition even when an actual arrangement state is unknown at the time of creating the machining program.

DESCRIPTION OF EMBODIMENTS

CAM software and a wire electrical discharge machine according to an embodiment of the present invention will be explained below in detail with reference to the accompanying drawings. The present invention is not limited to the embodiment.

Embodiment

Figure 1:
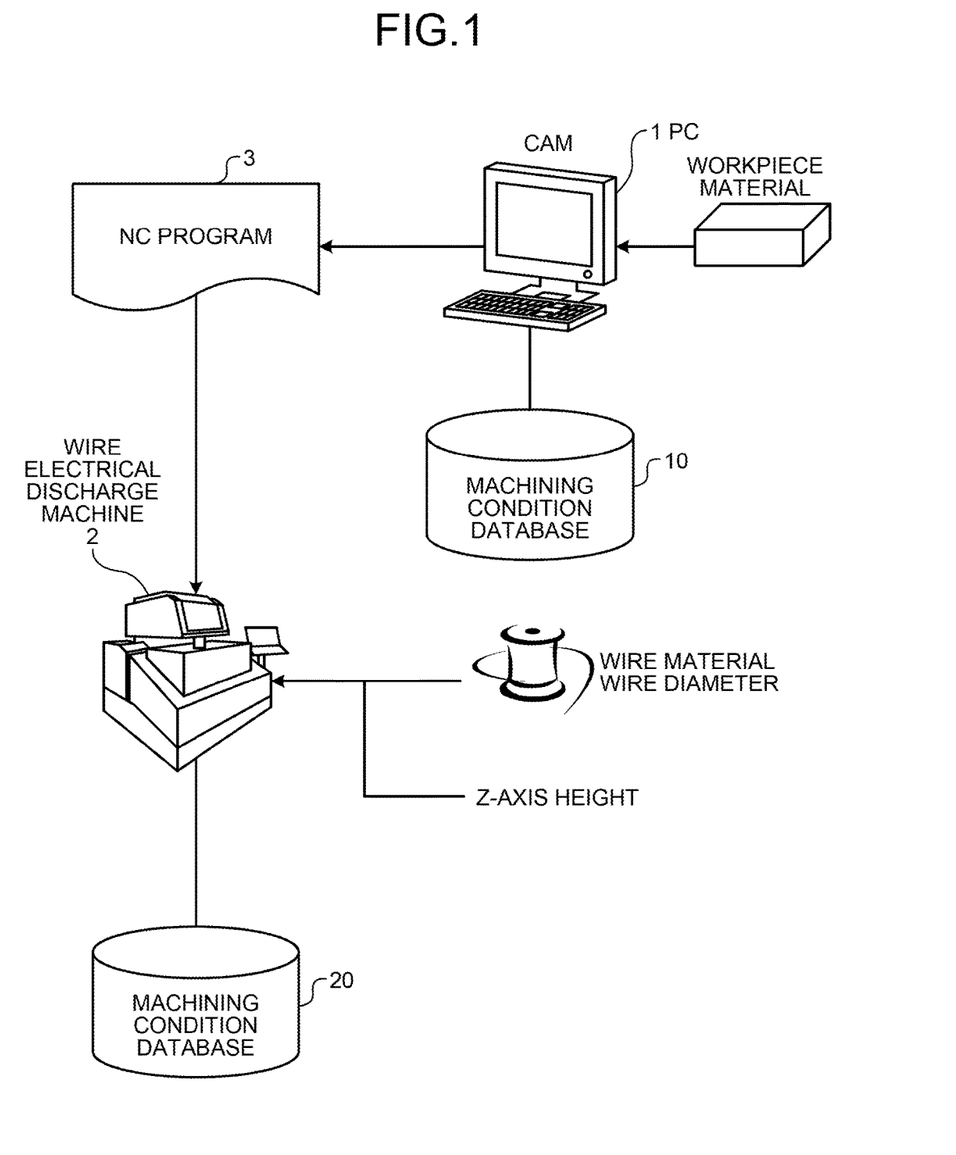
FIG. 1 is a diagram illustrating a configuration of a PC that executes CAM software and a wire electrical discharge machine according to an embodiment of the present invention, and a flow of processing thereof.

FIG. 1 is a diagram illustrating a configuration of a PC 1 that executes CAM software and a wire electrical discharge machine 2 according to an embodiment of the present invention, and a flow of processing thereof. The PC 1 is, for example, a personal computer that is offline from the wire electrical discharge machine 2. However, the PC 1 is not limited thereto as long as it is a computer. The wire electrical discharge machine 2 machines a workpiece based on an NC program 3 created by the PC 1 by executing the CAM software.

A machining condition database 10 is connected to the PC 1, and a machining condition database 20 is connected to the wire electrical discharge machine 2. In the machining condition database 10 and the machining condition database 20, specific contents of machining conditions such as an electrical condition, a wire tension, and a machining fluid pressure are associated with command codes that designate the machining conditions, respectively. The electrical condition includes, for example, types of voltage and power source, a pulse width, and a stop width.

Information on machining conditions suitable for arrangement states being setting conditions of the wire electrical discharge machine 2 and a workpiece is stored in the machining condition database 10. That is, the arrangement state and machining conditions suitable therefor or command codes that designate the machining conditions are stored in the machining condition database 10 while being associated with each other.

At the time of operating the wire electrical discharge machine 2, the arrangement state described above is decided in advance, and constituent elements that define the arrangement state, such as a "wire material", a "wire diameter", and a "Z-axis height" are set in a storage device (not illustrated) included in the wire electrical discharge machine 2. Therefore, an arrangement-state detection unit 25 (described later) included in the wire electrical discharge machine 2 can detect these constituent elements that decide the arrangement state. However, the method for detecting the arrangement state performed by the arrangement-state detection unit 25 is not limited to the method using the storage device. For example, the "Z-axis height" can be automatically determined by the wire electrical discharge machine 2 at the start of the operation of the wire electrical discharge machine 2.

Figure 2:
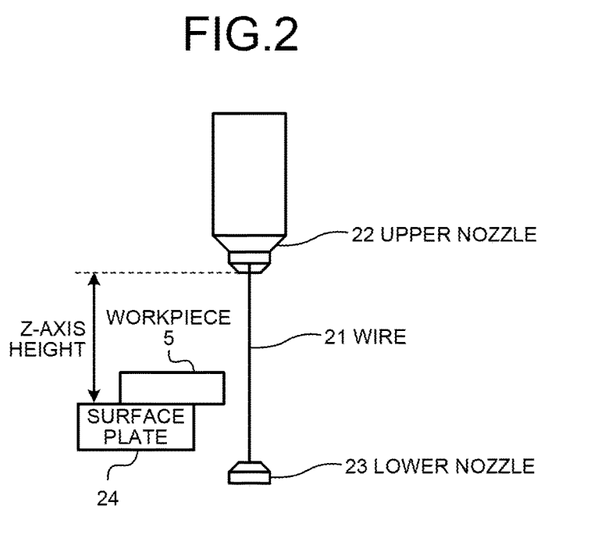
FIG. 2 is an explanatory diagram of a Z-axis height that defines an arrangement state according to the embodiment.

The "Z-axis height" is described with reference to FIG. 2. As illustrated in FIG. 2, in the wire electrical discharge machine 2, a wire 21 runs between an upper nozzle 22 and a lower nozzle 23 that eject a machining fluid to a workpiece 5, and the workpiece 5 placed on a surface plate 24 is subjected to wire electrical discharge machining. In this case, the "Z-axis height" is a height from the top surface of the surface plate 24 to an ejection port of the upper nozzle 22.

The "workpiece material" illustrated in FIG. 1 can be one of the constituent elements that decides the arrangement state. However, information on the "workpiece material" normally cannot be obtained by the wire electrical discharge machine 2. Therefore, when the "workpiece material" is considered as the constituent element of the arrangement state, the CAM software is informed of the "workpiece material" of the workpiece that is actually used. The CAM software according to the present embodiment selects a plurality of arrangement states that can actually be taken by the wire electrical discharge machine 2 based on other constituent elements of the arrangement state.

When the "workpiece material" can be determined using a camera (not illustrated) included in the wire electrical discharge machine 2, the "workpiece material" can be also the constituent element of the arrangement state, which can be detected by the arrangement-state detection unit 25 of the wire electrical discharge machine 2 similarly to the "wire material", the "wire diameter", and the "Z-axis height". That is, the "workpiece material" can be also the constituent element of the arrangement state, which is not defined yet at a stage of creating the NC program 3 similarly to the "wire material", the "wire diameter", and the "Z-axis height".

Figure 3:
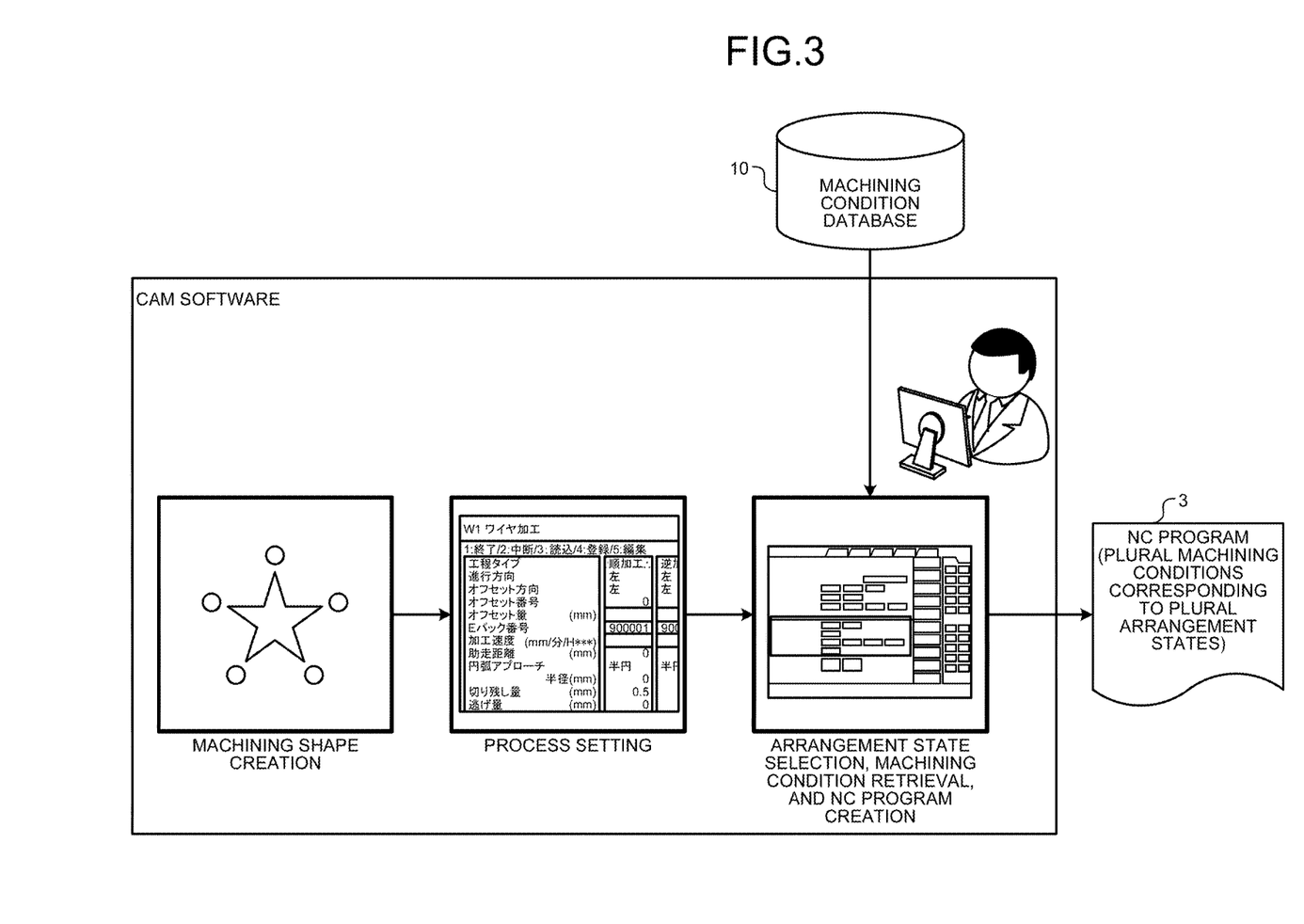
FIG. 3 is a schematic diagram illustrating a procedure of creating an NC program by the CAM software according to the embodiment.
Figure 4:
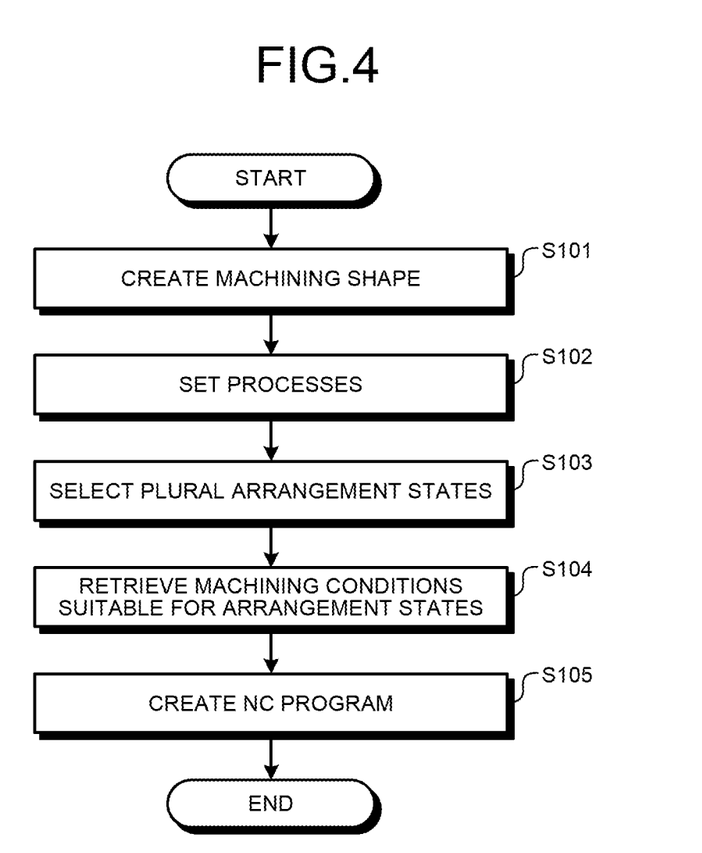
FIG. 4 is a flowchart illustrating a procedure of creating the NC program by the CAM software according to the embodiment.

A procedure of creating, with the CAM software according to the present embodiment, the NC program 3 as a machining program is illustrated by a schematic diagram of FIG. 3 and a flowchart of FIG. 4.

First, an operator creates a machining shape of a workpiece to be machined by the wire electrical discharge machine 2 (Step S101 in FIG. 4). Next, the operator decides the order of machining processes including rough machining and finish machining, and sets the processes (Step S102).

Subsequently, the CAM software automatically selects a plurality of arrangement states that are assumed to be actually taken by the wire electrical discharge machine 2 and the workpiece (Step S103). Step S103 is a procedure the CAM software causes the PC 1 to perform. Specifically, the CAM software causes the PC 1 to select a plurality of arrangement states in which values that can be actually taken by the constituent elements defining the arrangement states, such as the "wire material", the "wire diameter", and the "Z-axis height", respectively, are combined. For example, when BS (BraSs) or a soft wire is assumed as the "wire material"; 0.2 millimeter or 0.25 millimeter is assumed as the "wire diameter" being the diameter (ø) of the wire; and 10 millimeters, 20 millimeters, or 30 millimeters is assumed as the "Z-axis height", different arrangement states in which these values are combined are selected.

When a plurality of arrangement states are selected at Step S103, the CAM software searches the machining condition database 10 illustrated in FIGS. 1 and 3 for machining conditions corresponding to these arrangement states, respectively, and retrieves the machining conditions (Step S104). Specifically, the CAM software searches the machining condition database 10 for command codes that designate machining conditions suitable for the arrangement states selected at Step S103, respectively, and retrieves the command codes. Thereafter, the CAM software creates the NC program 3 in which the machining conditions retrieved at Step S104 are described with respect to the arrangement states selected at Step S103 (Step S105). Step S104 and Step S105 are also procedures the CAM software causes the PC 1 to perform.

Figure 5:
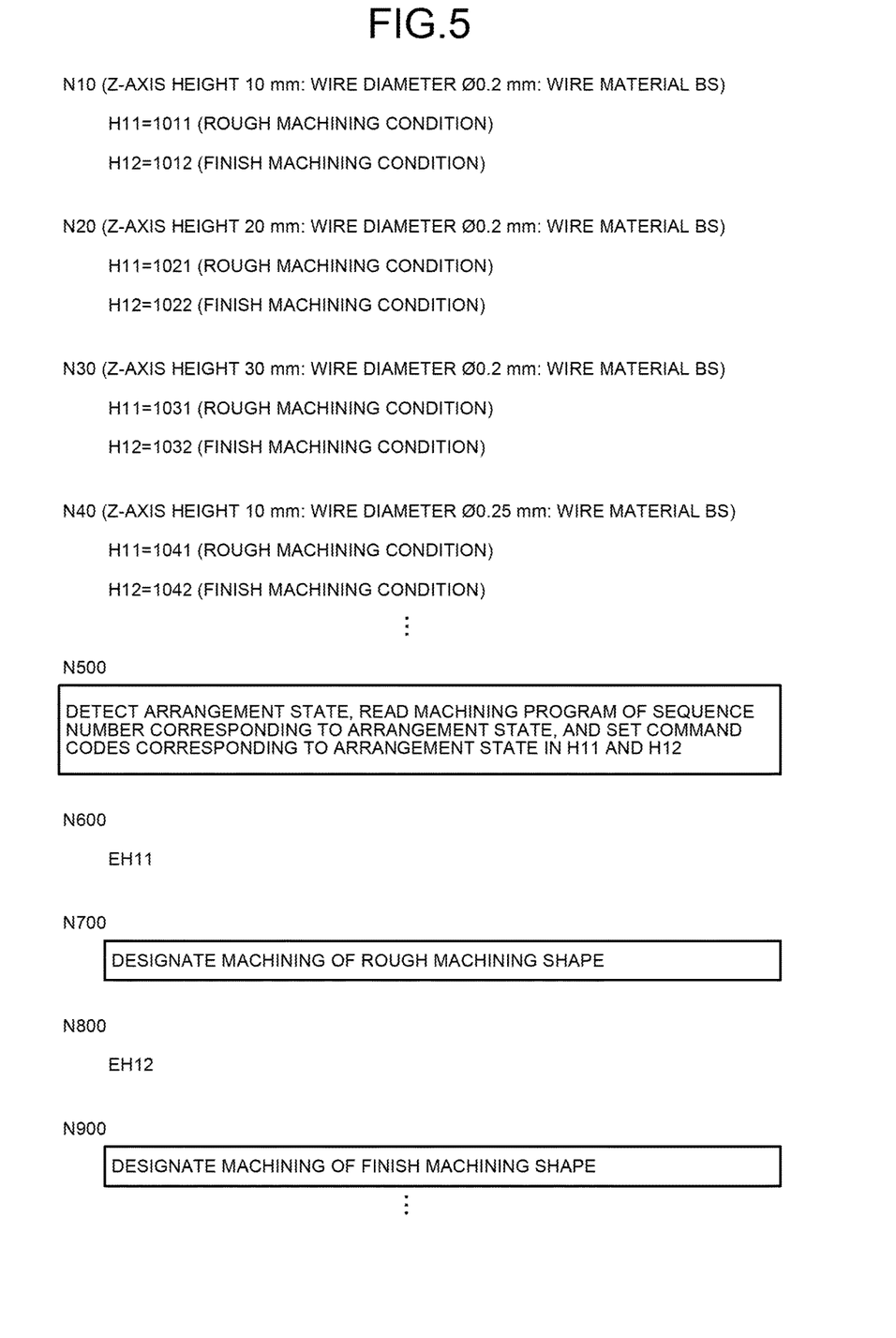
FIG. 5 is a diagram illustrating an example of the NC program according to the embodiment.

An example of the NC program 3 created by the CAM software and executed by the PC 1 is illustrated in FIG. 5. While parts of FIG. 5 are described in a numerical control program language, other parts are described in an everyday language to describe the contents in a comprehensible manner. The NC program 3 has sequence numbers N10, N20, N30, N40, . . . , N500, N600, N700, N800, and N900.

The sequence number N10 specifies machining conditions of the wire electric discharge machine 2 corresponding to and suitable for an arrangement state in which the "Z-axis height" is 10 millimeters, the "wire diameter" is 0.2 millimeter, and the "wire material" is BS. In this case, "H11" and "H12" are variables having command codes as values, respectively. The command codes are codes that designate specific contents of the machining conditions as described above and the specific contents are stored while being associated with the command codes, respectively, in the machining condition database 10 and the machining condition database 20. "H11" is, for example, a variable having a command code of a machining condition for rough machining as a value; and "H12" is, for example, a variable having a command code of a machining condition for finish machining as a value. While "H11"="1011" and "H12"="1012" in the sequence number N10 and a command code "1011" and a command code "1012" indicate different machining conditions, respectively, these are both machining conditions suitable for the arrangement state in which the "Z-axis height" is 10 millimeters, the "wire diameter" is 0.2 millimeter, and the "wire material" is BS.

The sequence number N20 specifies machining conditions of the wire electrical discharge machine 2 corresponding to and suitable for an arrangement state in which the "Z-axis height" is 20 millimeters, the "wire diameter" is 0.2 millimeter, and the "wire material" is BS. While "H11"="1021" and "H12"="1022" in the sequence number N20 and a command code "1021" and a command code "1022" indicate different machining conditions, respectively, these are both machining conditions suitable for the arrangement state in which the "Z-axis height" is 20 millimeters, the "wire diameter" is 0.2 millimeter, and the "wire material" is BS. Therefore, the command code "1021" and the command code "1022" are also different from the command code "1011" and the command code "1012" in the sequence number N10, respectively.

The sequence number N30 specifies machining conditions of the wire electrical discharge machine 2 corresponding to and suitable for an arrangement state in which the "Z-axis height" is 30 millimeters, the "wire diameter" is 0.2 millimeter, and the "wire material" is BS. While "H11"="1031" and "H12"="1032" in the sequence number N30 and a command code "1031" and a command code "1032" indicate different machining conditions, respectively, these are both machining conditions suitable for the arrangement state in which the "Z-axis height" is 30 millimeters, the "wire diameter" is 0.2 millimeter, and the "wire material" is BS. Therefore, the command code "1031" and the command code "1032" are also different from the command codes "1011" and "1012" in the sequence number N10 or the command codes "1021" and "1022" in the sequence number N20, respectively.

The sequence number N40 specifies machining conditions of the wire electrical discharge machine 2 corresponding to and suitable for an arrangement state in which the "Z-axis height" is 10 millimeters, the "wire diameter" is 0.25 millimeter, and the "wire material" is BS. While "H11"="1041" and "H12"="1042" in the sequence number N40 and a command code "1041" and a command code "1042" indicate different machining conditions, respectively, these are both machining conditions suitable for the arrangement state in which the "Z-axis height" is 10 millimeters, the "wire diameter" is 0.25 millimeter, and the "wire material" is BS. This arrangement state is different in the "wire diameter" from the arrangement states of the sequence numbers N10, N20, and N30; and the command code "1041" and the command code "1042" are different from those specified in the sequence numbers N10, N20, and N30, respectively.

As described above, in the NC program 3 according to the present embodiment, machining conditions suitable for different arrangement states that are distinguished by elements, for example, the "wire material", the "wire diameter" and the "Z-axis height" are specified in the NC program 3 for the respective arrangement states. Therefore, machining conditions are specified in sequence numbers following N40 for respective arrangement states corresponding to combinations of the elements of the "wire material", the "wire diameter" and the "Z-axis height".

After the machining conditions are specified for respective arrangement states in the sequence numbers N10, N20, N30, N40, . . . , the wire electrical discharge machine 2 is instructed to detect an arrangement state in a sequence number N500. In the sequence number N500, a machining program of a sequence number corresponding to the arrangement state detected by the wire electrical discharge machine 2 is also read to instruct setting of the command codes specified in the machining program of the corresponding sequence number in "H11" and "H12". Specifically, for example, when the "Z-axis height" is 10 millimeters, the "wire diameter" is a diameter (ø) of 0.2 millimeter, and the "wire material" is BS in the detected arrangement state, "H11"="1011" and "H12"="1012" in the sequence number N10 are read, "H11" is set as a rough machining condition "1011" and "H12" is set as a finish machining condition "1012".

The sequence number N600 directs in "EH11", the machining condition of rough machining that is set in "H11" to correspond to the arrangement state detected by the wire electrical discharge machine 2. Specifically, in the example described above, the wire electrical discharge machine 2 is directed "1011" as the rough machining condition. Subsequently, in the sequence number N700, machining of a rough machining shape under the rough machining condition "1011" is instructed.

The sequence number N800 directs in "EH12", the machining condition of finish machining set in "H12" to correspond to the arrangement state detected by the wire electrical discharge machine 2. Specifically, in the example described above, the wire electrical discharge machine 2 is directed "1012" as the finish machining condition. Subsequently, in the sequence number N900, machining of a finish machining shape under the finish machining condition "1012" is instructed.

Figure 6:
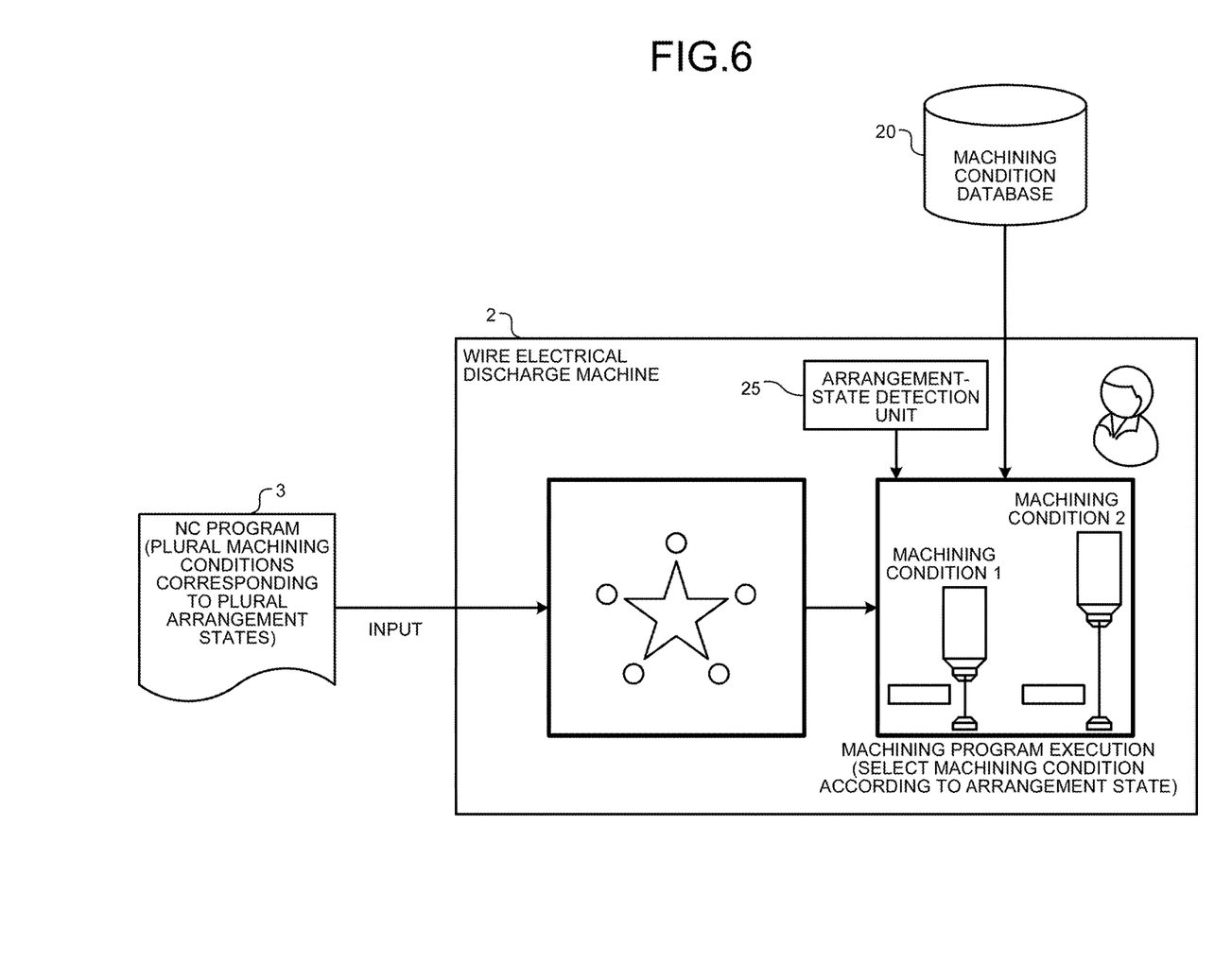
FIG. 6 is a schematic diagram illustrating workpiece machining performed by the wire electrical discharge machine according to the embodiment.

The wire electrical discharge machine 2 performs machining of a workpiece based on the NC program 3 created by the CAM software. FIG. 6 is a schematic diagram illustrating workpiece machining performed by the wire electrical discharge machine 2 based on the NC program 3. As illustrated in FIG. 6, the wire electrical discharge machine 2 includes the arrangement-state detection unit 25 that can detect an actual arrangement state. Because the wire electrical discharge machine 2 is connected also to the machining condition database 20, specific contents of a machining condition suitable for the actual arrangement state detected by the arrangement-state detection unit 25 are retrieved from the machining condition database 20 in a manner as described later to machine the workpiece.

Figure 7:
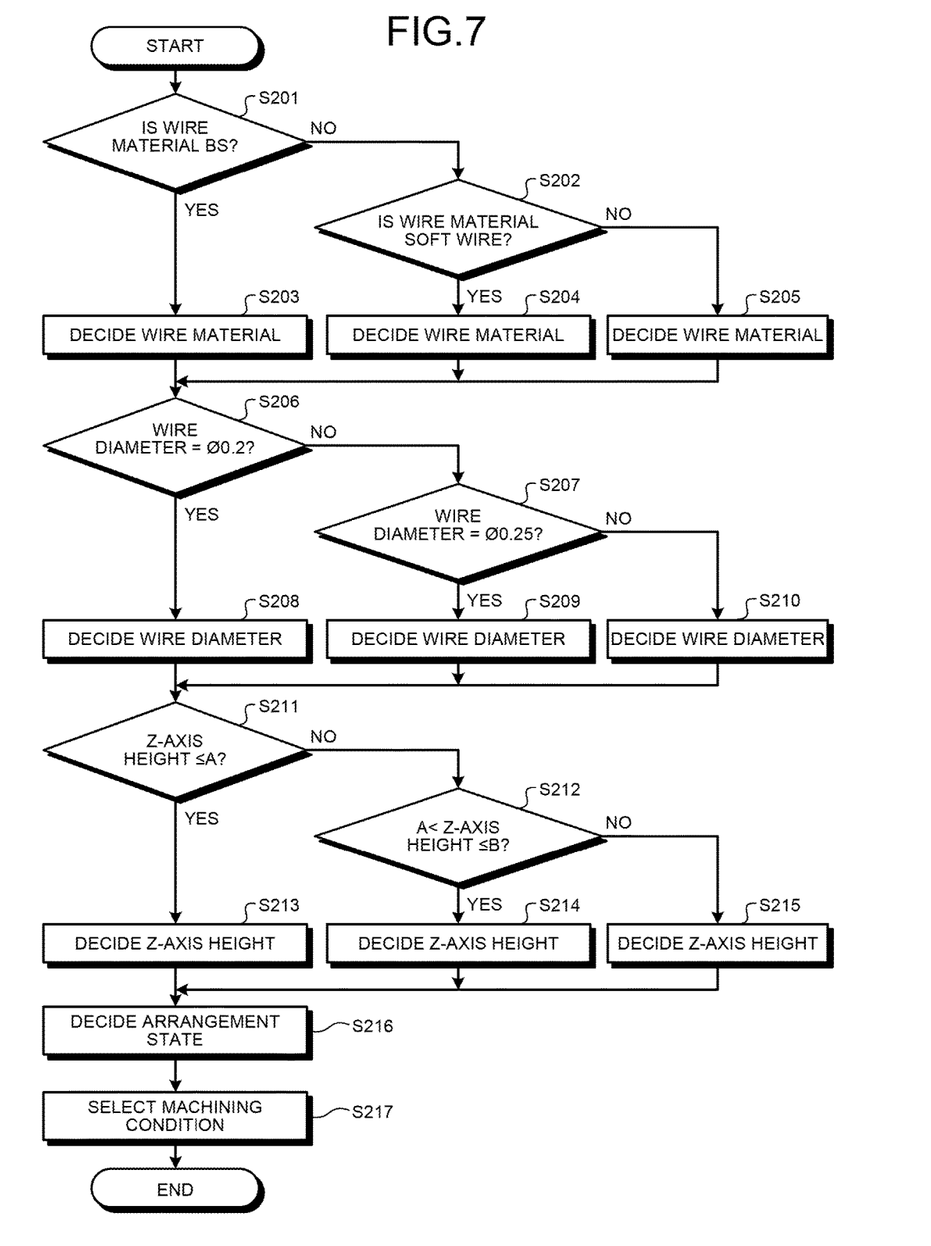
FIG. 7 is a flowchart illustrating a procedure performed by the wire electrical discharge machine according to the embodiment to detect an arrangement state and to select a machining condition.

The wire electrical discharge machine 2 illustrated in FIG. 6 performs wire electrical discharge machining of the workpiece 5 based on the NC program 3 illustrated in FIG. 5. Prior to actual machining, the arrangement-state detection unit 25 of the wire electrical discharge machine 2 detects an arrangement state based on an instruction of the sequence number N500 in FIG. 5. FIG. 7 is a flowchart illustrating a procedure performed by the wire electrical discharge machine 2 to detect an arrangement state and to select a machining condition.

Specifically, whether the "wire material" is BS is first determined at Step S201. When the "wire material" is BS (YES at Step S201 in FIG. 7), the procedure proceeds to Step S203 to decide that the "wire material" is BS. When the "wire material" is not BS (NO at Step S201), the procedure proceeds to Step S202. At Step S202, whether the "wire material" is a soft wire is determined. When the "wire material" is a soft wire (YES at Step S202), the procedure proceeds to Step S204 to decide that the "wire material" is a soft wire. When the "wire material" is not a soft wire (NO at Step S202), the procedure proceeds to Step S205 to decide that the "wire material" is neither BS nor a soft wire. After Steps S203, S204, and S205, the procedure proceeds to Step S206.

At Step S206, whether the "wire diameter" is 0.2 millimeter is determined. When the "wire diameter" is 0.2 millimeter (YES at Step S206), the procedure proceeds to Step S208 to decide that the "wire diameter" is 0.2 millimeter. When the "wire diameter" is not 0.2 millimeter (NO at Step S206), the procedure proceeds to Step S207. At Step S207, whether the "wire diameter" is 0.25 millimeter is determined. When the "wire diameter" is 0.25 millimeter (YES at Step S207), the procedure proceeds to Step S209 to decide that the "wire diameter" is 0.25 millimeter. When the "wire diameter" is not 0.25 millimeter (NO at Step S207), the procedure proceeds to Step S210 to decide that the "wire diameter" is neither 0.2 millimeter nor 0.25 millimeter. After Steps S208, S209, and S210, the procedure proceeds to Step S211.

At Step S211, whether the "Z-axis height" is equal to or smaller than A is determined. When the "Z-axis height" is equal to or smaller than A (YES at Step S211), the procedure proceeds to Step S213 to decide that the "Z-axis height" is equal to or smaller than A. When the "Z-axis height" is not equal to or smaller than A (NO at Step S211), the procedure proceeds to Step S212. At Step S212, whether the "Z-axis height" is equal to or smaller than B is determined. When the "Z-axis height" is equal to or smaller than B (YES at Step S212), the procedure proceeds to Step S214 to decide that the "Z-axis height" is larger than A and equal to or smaller than B. When the "Z-axis height" is not equal to or smaller than B (NO at Step S212), the procedure proceeds to Step S215 to decide that the "Z-axis height" is larger than B. When it is assumed, for example, that A=15 millimeters and B=25 millimeters, the "Z-axis heights", which are 10 millimeters, 20 millimeters, and 30 millimeters and are distinguished by the sequence numbers N10, N20, and N30 in FIG. 5, can be distinguished. After Steps S213, S214, and S215, the procedure proceeds to Step S216.

At Step S216, an arrangement state is decided because the "wire material" is decided at Steps S203, S204, and S205, the "wire diameter" is decided at Steps S208, S209, and S210, and the "Z-axis height" is decided at Steps S213, S214, and S215.

When the arrangement state is decided at Step S216, a machining condition corresponding to the arrangement state is selected based on the instruction of the sequence number N500 in FIG. 5 (Step S217). Specifically, values of command codes corresponding to a machining condition for each arrangement state are set in "H11" and "H12" being variables that have the command codes of the machining condition as values, respectively. For example, when the procedure proceeds to Step S203 where it is decided that the "wire material" is BS; the procedure proceeds to Step S208 where it is decided that the "wire diameter" is 0.2 millimeter; and the procedure proceeds to Step S213 where it is decided that the "Z-axis height" is equal to or smaller than A=15 millimeters; the sequence number N10 is referred to and a machining condition is selected as "H11"="1011" and "H12"="1012". In this way, the flow, up to selection of the machining condition, ends.

Thereafter, when the machining condition is to be actually set in the wire electrical discharge machine 2 in "EH11" of the sequence number N600 and "EH12" of the sequence number N800, the machining condition database 20 is referred to as illustrated in FIG. 6 and specific electrical conditions corresponding to command codes are retrieved to be set in the wire electrical discharge machine 2. In this manner, rough machining of the sequence number N700 and finish machining of the sequence number N900 are performed under the machining condition set according to the arrangement state.

In the above descriptions, the arrangement-state detection unit 25 of the wire electrical discharge machine 2 detects an actual arrangement state based on the command of the sequence number N500 of the NC program 3 illustrated in FIG. 5. However, the command described in the sequence number N500 may not always need to be described in the NC program 3. For example, a workpiece may be machined as control software of the wire electrical discharge machine 2: instructs the arrangement-state detection unit 25 to detect an actual arrangement state according to a certain command from outside of the wire electrical discharge machine 2; obtains a command code corresponding to a machining condition suitable for the detected arrangement state from the NC program 3; and sets the machining condition designated by the command code in the wire electrical discharge machine 2.

As described above, with the CAM software according to the present embodiment, creation of the NC program 3 including a machining condition can be achieved by the PC 1 in an offline state even when an actual arrangement state is unknown or is not determined yet. Therefore, decision of a machining condition suitable for an actual arrangement state and edition of the NC program 3 by an operator of the wire electrical discharge machine 2 are not required. Accordingly, occurrence of an operation error can be prevented.

The configuration described in the above embodiment is only an example of the contents of the present invention. The configuration can be combined with other publicly known techniques, and a part of the configuration can be omitted or modified without departing from the scope of the present invention.

REFERENCE SIGNS LIST

1 PC, 2 wire electrical discharge machine, 3 NC program, 5 workpiece, 10, 20 machining condition database, 21 wire, 22 upper nozzle, 23 lower nozzle, 24 surface plate, 25 arrangement-state detection unit.

The invention claimed is:

1. A non-transitory computer readable recording medium having recorded therein Computer Aided Manufacturing (CAM) software configured to cause a computer to create a machining program for a wire electrical discharge machine comprising an upper nozzle, a lower nozzle, a wire running between the upper nozzle and the lower nozzle, and a plate on which a workpiece is placed such that the workpiece faces the upper nozzle, the machining program being used to machine the workpiece according to a machining condition among machining conditions, the CAM software causing the computer to perform:
a first procedure of selecting setting conditions of the wire electrical discharge machine and the workpiece, the setting conditions being different from each other;
a second procedure of retrieving the machining conditions corresponding to the setting conditions selected in the first procedure, from a database that stores a correspondence between the setting conditions and the machining conditions suitable for the setting conditions; and
a third procedure of creating the machining program in which the machining conditions retrieved in the second procedure are associated with the setting conditions selected in the first procedure, respectively, wherein the CAM software further causes the computer to:
identify an actual setting condition comprising a wire material, a wire diameter, and a height between the plate and the upper nozzle, wherein the machining program includes a first plurality of different values of the wire material, a second plurality of different values of the wire diameter, and a third plurality of different values of the height, and
identify the machining condition to machine the workpiece based on information which is obtained based on the actual setting condition and indicates a first particular value among the first plurality of different values corresponding to the wire material, a second particular value among the second plurality of different values corresponding to the wire diameter, and a third particular value among the third plurality of different values corresponding to the height, the first particular value, the second particular value, and the third particular value being included in a combination associated with the machining condition among a plurality of combinations of the setting conditions associated with the machining conditions in the machining program.

2. The non-transitory computer readable recording medium according to claim 1, wherein the wire material comprises at least one from among a soft wire and a brass wire.

3. A wire electrical discharge machine configured to machine a workpiece according to a machining condition based on a machining program, the wire electrical discharge machine comprising:
an upper nozzle;
a lower nozzle;
a plate on which the workpiece is placed to face the upper nozzle;
an arrangement-state detector configured to detect an actual setting condition comprising a wire material, a wire diameter, and a height between the plate and the upper nozzle; and
a wire running between the upper nozzle and the lower nozzle, the wire configured to machine the workpiece according to the machining condition suitable for the actual setting condition based on the machining program,
wherein the machining program associates a plurality of machining conditions including the machining condition suitable for the actual setting condition with setting conditions suitable for the plurality of machining conditions, the setting conditions being different from each other and include a first plurality of different values of the wire material, a second plurality of different values of the wire diameter, and a third plurality of different values of the height, and
the wire electrical discharge machine is configured to:
identify the machining condition to machine the workpiece based on information which is obtained based on the actual setting condition and indicates a first particular value among the first plurality of different values corresponding to the wire material, a second plurality value among the second plurality of different values corresponding to the wire diameter, and a third particular value among the third plurality of different values corresponding to the height, the first particular value, the second particular value, and the third particular value being included in a combination associated with the machining condition among a plurality of combinations of the setting conditions associated with the plurality of machining conditions in the machining program.

4. The wire electrical discharge machine according to claim 3, wherein the arrangement-state detector is further configured to detect the actual setting condition according to a command received from a device external to the wire electrical discharge machine.

5. The wire electrical discharge machine according to claim 3, wherein the wire material comprises at least one from among a soft wire and a brass wire.

* * * * *